(12) United States Patent
Miura

(10) Patent No.: US 6,628,700 B1
(45) Date of Patent: Sep. 30, 2003

(54) CDMA RECEPTION METHOD AND CDMA RECEIVER

(75) Inventor: Tetsuya Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/377,845

(22) Filed: Aug. 20, 1999

(30) Foreign Application Priority Data

Aug. 24, 1998 (JP) .......................................... 10-236913

(51) Int. Cl.⁷ .............................................. H04B 1/707
(52) U.S. Cl. ........................ 375/148; 375/149; 375/150
(58) Field of Search ................................ 375/148, 149, 375/150, 142, 143, 144, 145; 370/320, 335, 342, 441

(56) References Cited

U.S. PATENT DOCUMENTS

| | | | | |
|---|---|---|---|---|
| 5,740,208 A | * | 4/1998 | Hulbert et al. | 375/346 |
| 6,067,293 A | * | 5/2000 | Shoji | 370/342 |
| 6,137,788 A | * | 10/2000 | Sawahashi et al. | 370/342 |
| 6,178,193 B1 | * | 1/2001 | Kondo | 375/130 |
| 6,363,104 B1 | * | 3/2002 | Bottomley | 375/148 |

FOREIGN PATENT DOCUMENTS

JP 10-173629 6/1996

* cited by examiner

*Primary Examiner*—Don N. Vo
(74) *Attorney, Agent, or Firm*—Sughrue Mion, PLLC

(57) ABSTRACT

In a CDMA reception method, a plurality of different reference reception delay amounts are preset on the basis of a correlation profile obtained by de-spreading a reception signal. A plurality of correlation values are obtained on the basis of at least each of the preset reference reception delay amounts. A plurality of interference wave levels are measured on the basis of the obtained correlation values. Whether detection signals obtained from the respective correlation values are synthesized is determined on the basis of reception qualities obtained from the correlation values corresponding to the measured interference wave levels. Permitted detection signals are synthesized, and the synthetic signal is decoded. A CDMA receiver is also disclosed.

14 Claims, 15 Drawing Sheets

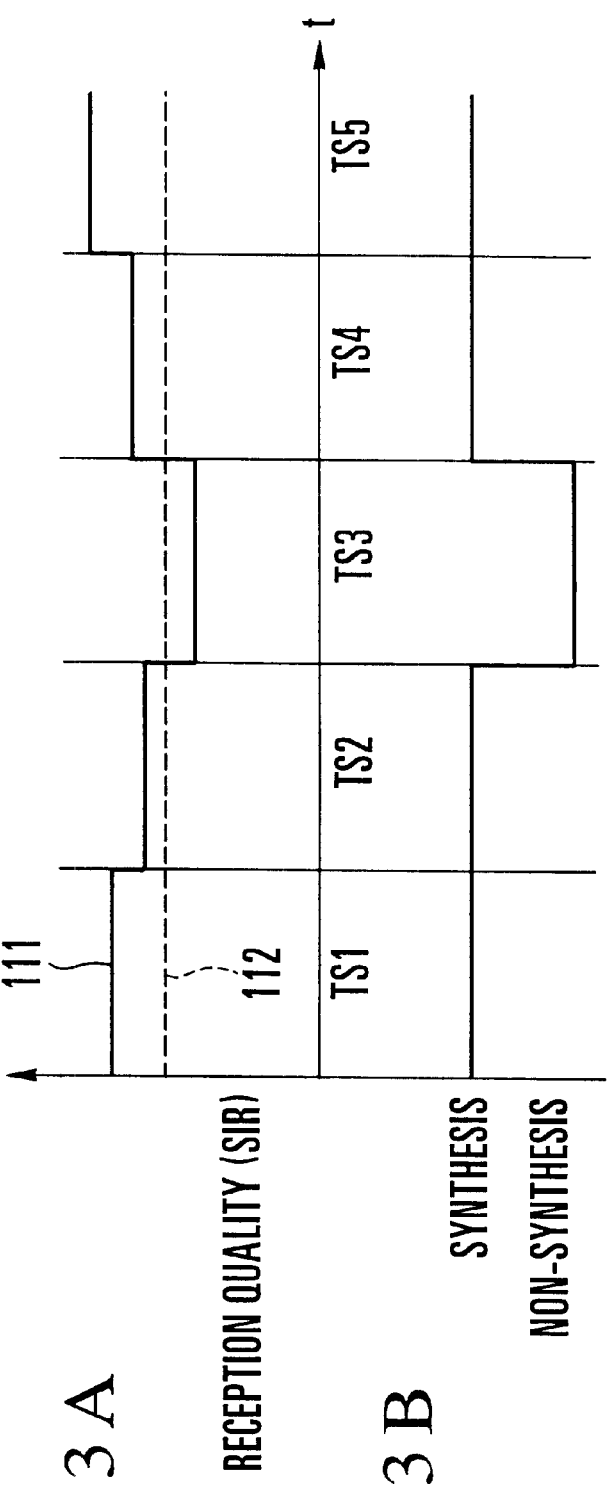

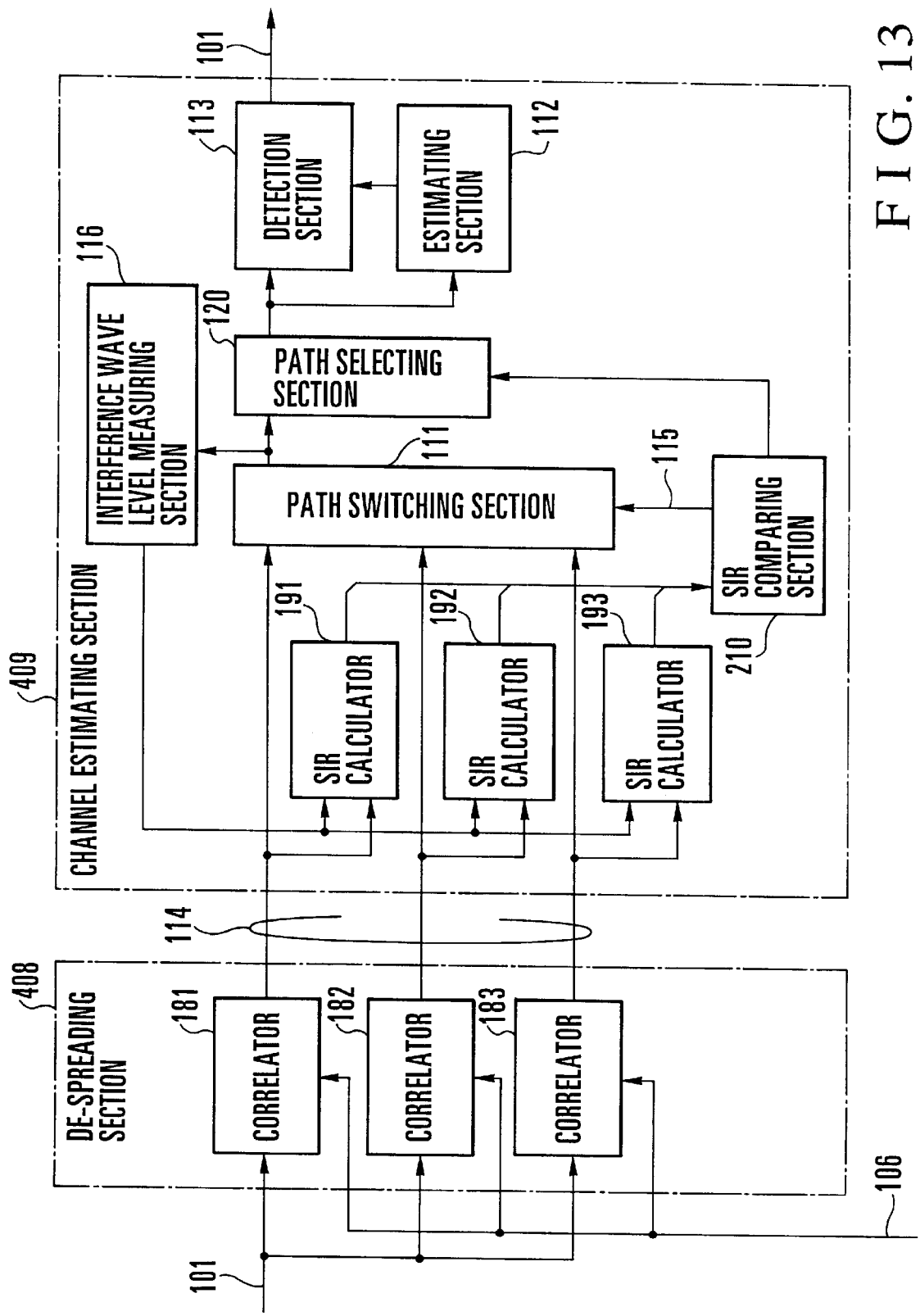

CDMA RECEPTION METHOD AND CDMA RECEIVER

BACKGROUND OF THE INVENTION

The present invention relates to a CDMA reception method and CDMA receiver which are used for a mobile communication system based on the CDMA (Coded Division Multiple Access) scheme.

In general, in a mobile communication system based on the CDMA scheme, a signal to be transmitted is spread and transmitted by using a predetermined spreading code on the transmitter side, and the signal received on the receiver side is de-spread by using the spreading code used on the transmitter side to obtain a desired signal. This system also uses the RAKE reception scheme of de-spreading signals received through a plurality of paths (propagation paths) by using reception delay amounts (reception timings) corresponding to the respective paths, detecting the signals, and synthesizing the resultant signals. With this scheme, the influences of multipath interference are suppressed, and a reduction in transmission power is attained.

Conventionally, a CDMA receiver such as a portable telephone used in a mobile communication system based on the CDMA scheme has an arrangement like the one shown in FIGS. 14A and 14B.

As shown in FIG. 14A, the CDMA receiver is comprised of a plurality of FINGER processing sections 2A to 2N respectively having de-spreading sections 8 and channel estimating sections 9 and arranged in parallel with respect to a reception signal 1, a RAKE synthesizing section 3 for synthesizing detection outputs 7 from the FINGER processing sections 2A to 2N, a decoding section 4 for decoding the synthetic output from the RAKE synthesizing section 3, and a synchronous acquisition following section 5 for respectively outputting delay amount designation signals to the FINGER processing sections 2A to 2N on the basis of the reception signal 1.

The reception signal 1 is input to each of the FINGER processing sections 2A to 2N. Each signal is then de-spread by being multiplied by the spreading code used on the transmission side by a correlator 81 of the de-spreading section 8 on the basis of a corresponding delay amount designation signal 6 designated by the synchronous acquisition following section 5, as shown in FIG. 14B.

The synchronous acquisition following section 5 obtains a correlation profile by multiplying the reception signal 1 by the spreading code used on the transmission side while shifting the phase of the code little by little. In the obtained correlation profile, correlation values larger than a predetermined threshold are selected by a predetermined number in the descending order of peak values. In this case, the respective reception delay amounts used to obtain the selected correlation values are sent as the delay amount designation signals 6 optimal for the respective paths to the de-spreading sections 8 of the FINGER processing sections 2A to 2N.

Correlation values 14 obtained by the respective de-spreading sections 8 are input to detection sections 13 of the channel estimating sections 9 and subjected to interpolation of a fading phase shift on the basis of the channel estimation vectors obtained from the correlation values 14 by estimating sections 12. The resultant data are output as detection data 7.

The detection data 7 obtained by the FINGER processing sections 2A to 2N using the reception delay amounts corresponding to the respective paths are added/synthesized by the RAKE synthesizing section 3. The decoding section 4 decodes the resultant data to obtain a desired signal.

In such a conventional CDMA reception method, however, it takes a certain period of time to perform reception delay amount selection processing in the synchronous acquisition following section 5. For this reason, if the reception quality of a predetermined path deteriorates within this processing period, the normal detection data 7 cannot be obtained from the FINGER processing section corresponding to the path. As a consequence, the reception quality of the signal obtained by RAKE synthesis also deteriorates.

SUMMARY OF THE INVENTION

It is an object of the present invention to provide a CDMA reception method and CDMA receiver which can suppress a deterioration in the reception quality of a signal obtained by RAKE synthesis even if a reception condition changes within a reception delay amount selection processing period.

In order to achieve the above object, according to the present invention, there is provided a CDMA reception method comprising the steps of presetting a plurality of different reference reception delay amounts on the basis of a correlation profile obtained by de-spreading a reception signal, obtaining a plurality of correlation values on the basis of at least each of the preset reference reception delay amounts, measuring a plurality of interference wave levels on the basis of the obtained correlation values, determining, on the basis of reception qualities obtained from the correlation values corresponding to the measured interference wave levels, whether detection signals obtained from the respective correlation values are synthesized; and synthesizing permitted detection signals and decoding the synthetic signal.

BRIEF DESCRIPTION OF THE DRAWINGS

FIGS. 3A and 3B are timing charts showing the operations of an SIR comparing section and path selecting section in FIG. 1B;

FIG. 13 is a block diagram showing a de-spreading section and channel estimating section according to the fourth embodiment of the present invention;

DESCRIPTION OF THE PREFERRED EMBODIMENTS

The present invention will be described in detail below with reference to the accompanying drawings.

Figure 1A:
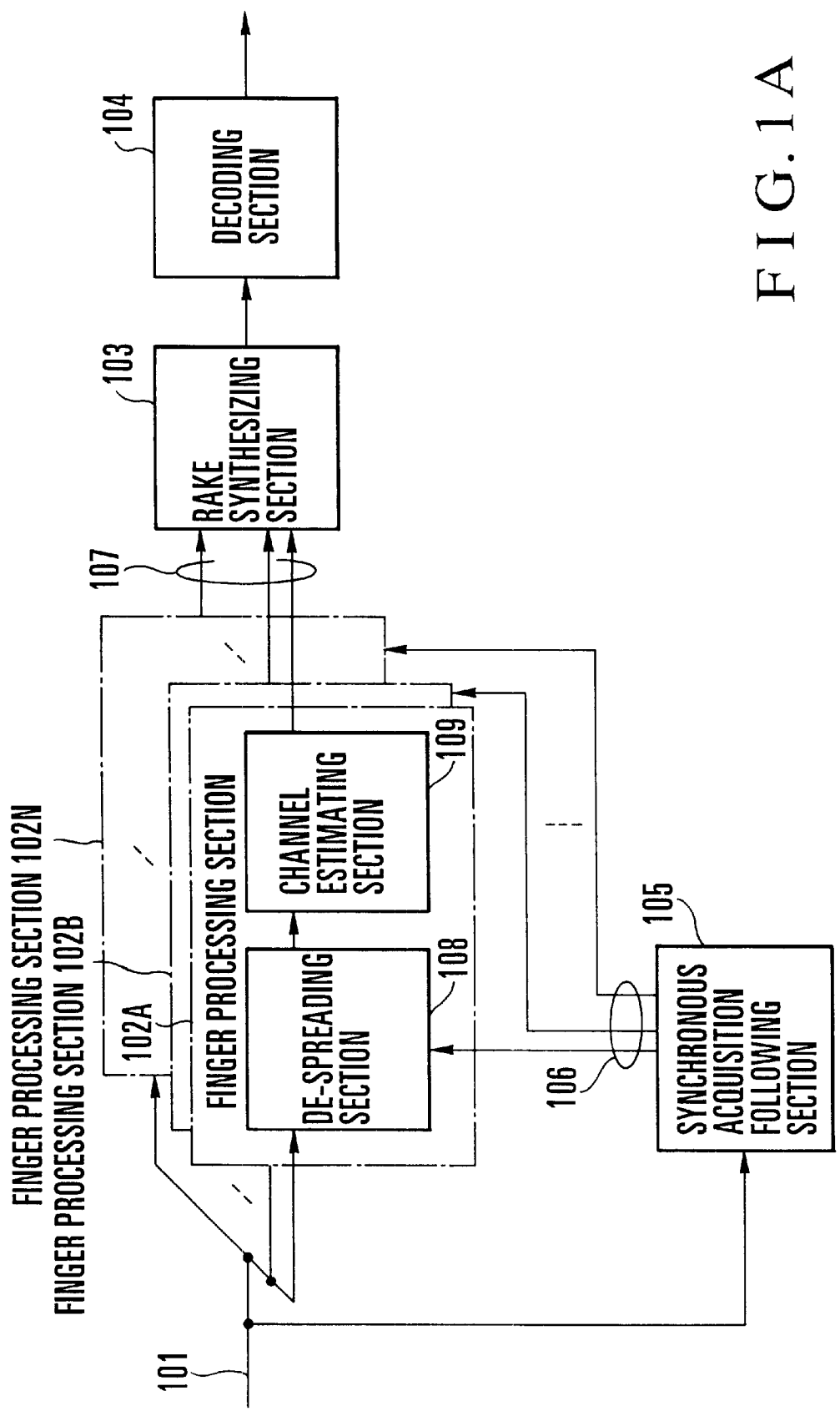
FIG. 1A is a block diagram showing a CDMA receiver according to the first embodiment of the present invention.

FIG. 1A shows a CDMA receiver according to the first embodiment of the present invention. This embodiment uses a RAKE reception scheme of de-spreading a plurality of reception signals propagating through different paths (propagation paths) with reception delay amounts (reception timings) corresponding to the respective paths, detecting the resultant signals, and synthesizing them.

As shown in FIG. 1A, the CDMA receiver is comprised of a plurality of FINGER processing sections 102A to 102N respectively having de-spreading sections 108 and channel estimating sections 109 and arranged in parallel with respect to a reception signal 101, a RAKE synthesizing section 103 for synthesizing detection outputs 107 from the FINGER processing sections 102A to 102N, a decoding section 104 for decoding the synthetic output from the RAKE synthesizing section 103, and a synchronous acquisition following section 105 for outputting delay amount designation signals to the FINGER processing sections 102A to 102N on the basis of the reception signal 101.

The de-spreading section 108 of each of the FINGER processing sections 102A to 102N includes a correlator 181 for outputting a correlation value 114 by multiplying the reception signal 101 by the spreading code used on the transmission side on the basis of the reception delay amount designated by a delay amount designation signal 106 from the synchronous acquisition following section 105.

The channel estimating section 109 of each of the FINGER processing sections 102A to 102N includes an estimating section 112 for obtaining a predetermined channel estimation vector from the correlation value 114 obtained by the de-spreading section 108, and a detection section 113 for interpolating a fading phase shift of the correlation value 114 on the basis of the estimation vector from the estimating section 112, and outputting the resultant data as detection data 107.

The synchronous acquisition following section 105 obtains a delay profile indicating the relationship between a reception delay amount and a correlation value level by multiplying the reception signal 101 by the phase difference, i.e., the reception delay amount, between the spreading code used on the transmission side and the reception signal 101 while shifting the phase difference little by little. Of the correlation values indicating the peaks of the obtained delay profile, correlation values larger than a predetermined threshold are selected by a predetermined number in descending order. The reception delay amounts of the selected correlation values are sent as the delay amount designation signals 106 optimal for the respective paths to the de-spreading sections 108 of the FINGER processing sections 102A to 102N.

Figure 7:
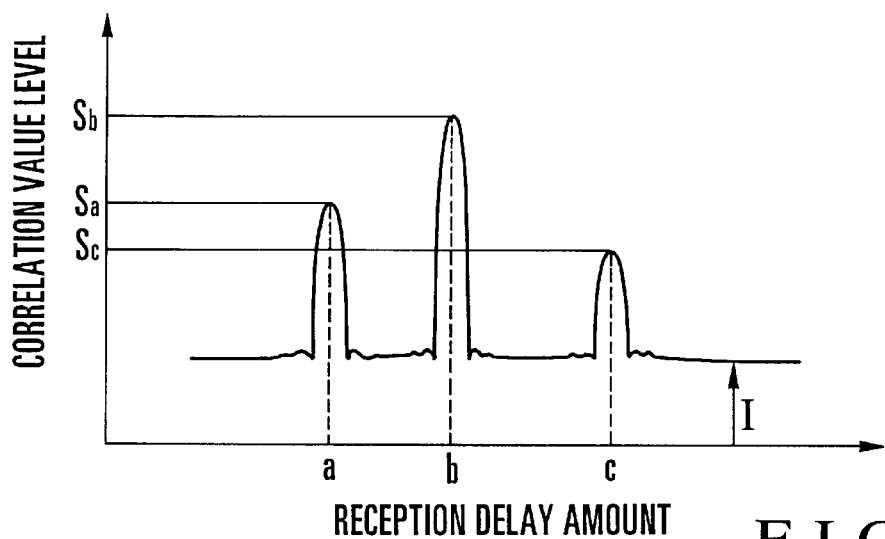
FIG. 7 is a graph for explaining a delay profile indicating the relationship between a correlation value/level and a reception delay amount.

FIG. 7 shows an example of a delay profile, which indicates the relationship between the correlation value level and the reception delay amount.

Referring to FIG. 7, reference symbols Sa to Sc denote the correlation value levels of reception delay amounts $a$ to c. Level I indicates the levels of various types of interference waves contained in the reception signal 101. In this case, the synchronous acquisition following section 105 selects the three reception delay amounts $a$, b, and c larger than a predetermined determined threshold in descending order, and sends the reception delay amounts $a$ to c to some of the FINGER processing sections 102A to 102N.

With this operation, paths having the respective reception delay amounts are allocated from the synchronous acquisition following section 105 to the FINGER processing sections 102A to 102N. The respective FINGER processing sections 102A to 102N de-spread the reception signal 101 by using the designated reception delay amounts and output the correlation values 114 of the respective paths.

In addition to the estimating section 112 and detection section 113, the channel estimating section 109 of each of the FINGER processing sections 102A to 102N includes an interference wave level measuring section 116 for measuring the interference wave level contained in the correlation value 114 obtained by the de-spreading section 108, an SRI calculator 191 for calculating a signal to interference ratio (SIR) from the interference wave level measured by the interference wave level measuring section 116 and the correlation value 114, an SIR comparing section 110 for comparing the reception quality calculated by the SRI calculator 191 with a predetermined threshold, and a path selecting section 120 for outputting the correlation value 114 from the de-spreading section 108 to the detection section 113 or stopping outputting the correlation value 114 on the basis of a path selection signal 119 corresponding to the comparison result obtained by the SIR comparing section 110.

Figure 2:
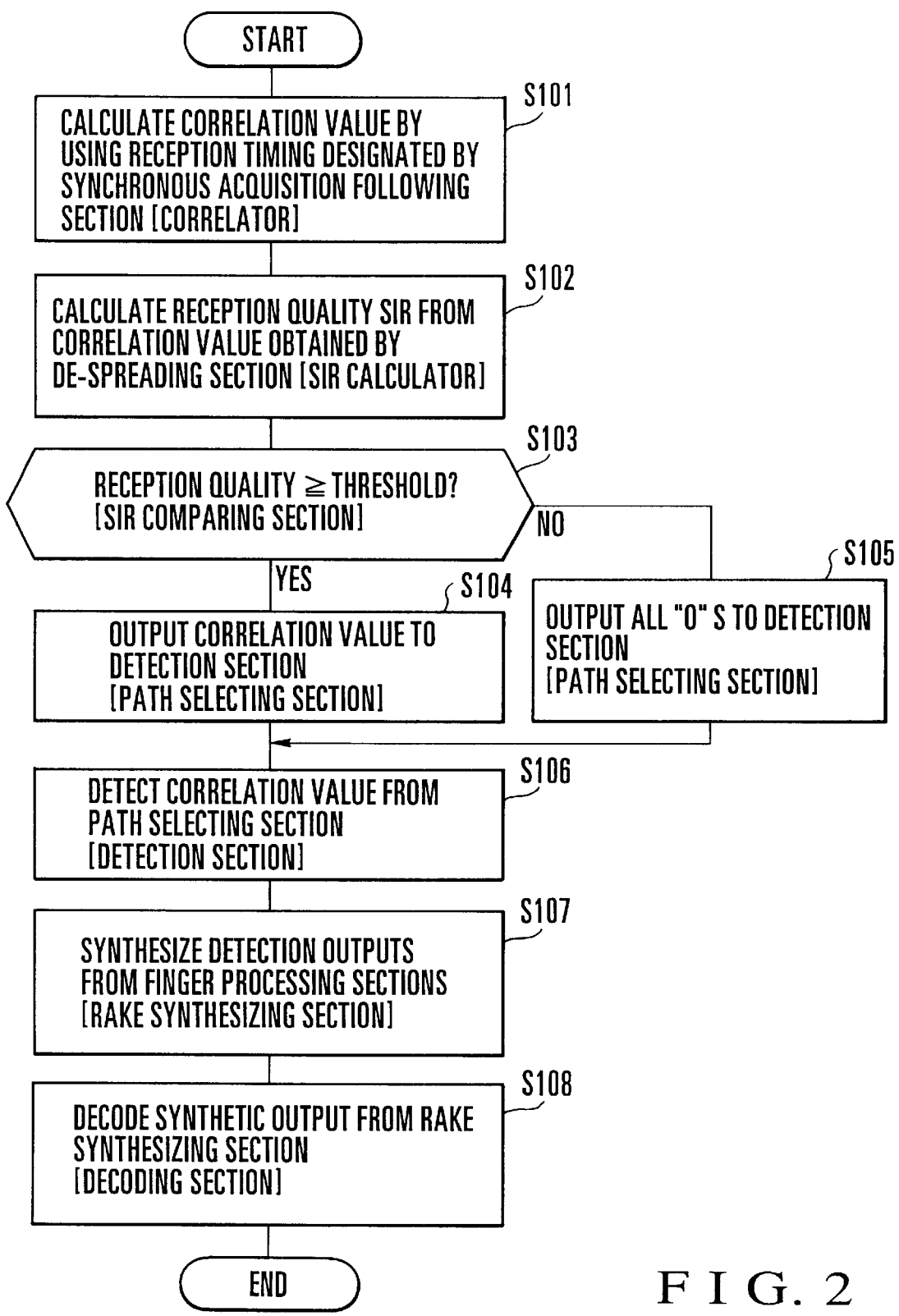
FIG. 2 is a flow chart showing the operation of the CDMA receiver in FIG. 1A.

The operation of the CDMA receiver having the above arrangement will be described next with reference to the flow chart of FIG. 2 and the timing charts of FIGS. 3A and 3B.

First of all, the de-spreading section 108 of each of the FINGER processing sections 102A to 102N calculates the correlation value 114 from the reception signal 101 through the correlator 181 by using the predetermined reception delay amount (reception timing) designated by the delay amount designation signal 106 from the synchronous acquisition following section 105 (step S101).

The channel estimating section 109 calculates a reception quality (SIR) from the correlation value 114 obtained by the correlator 181 by using the SRI calculator 191 (step S102). In this case, the SRI calculator 191 calculates the reception quality on the basis of the ratio of the interference wave level measured by the interference wave level measuring section 116 to the correlation value 114.

The comparing section 110 compares the calculated reception quality with the threshold (step S103). If the reception quality is higher than the threshold, the correlation value 114 is output to the detection section 113 through the path selecting section 120 (step S104). If the reception quality is lower than the threshold, the output of the correlation value 114 is stopped, and a value indicating invalidity (all "0"s) is output instead (step S105).

Figure 8:
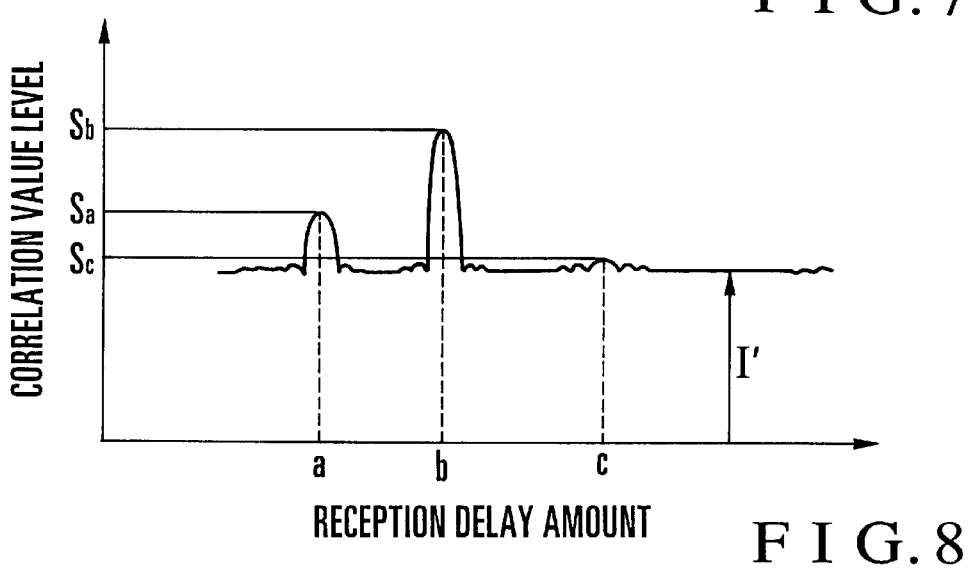
FIG. 8 is a graph for explaining another delay profile indicating the relationship between a correlation value level and a reception delay amount.

If, for example, the influence of an interference wave in FIG. 7 increases while the levels Sa to Sc do not change much, the level of the interference wave rises from I to I' as a whole, as shown in FIG. 8. As a result, there is little difference between the correlation value level Sc and the interference wave level I', and hence no proper correlation value can be obtained from the path with the reception delay amount c.

At this time, the SRI calculator 191 calculates the reception quality SIR on the basis of the ratio of the correlation value level S to the interference wave level I. Considering, for example, the reception delay amount c, a reception quality Sc/I' in FIG. 8 on which the influence of the interference wave increases is obviously lower (deteriorates) than a reception quality Sc/I in FIG. 7.

Subsequently, the detection section 113 detects the correlation value from the path selecting section 120 (step S106) and outputs the detection output 107 to the RAKE synthesizing section 103. The RAKE synthesizing section 103 synthesizes the detection outputs 107 from the FINGER processing sections 102A to 102N (step S107). The decoding section 104 decodes this synthesis result (step S108).

As shown in FIG. 3A, therefore, the SIR comparing section 110 compares a reception quality 111 from the SRI calculator 191 with a threshold 112 for each reception delay amount designated by the synchronous acquisition following section 105, i.e., each of time slots TS1 to TS5. Synthesis/non-synthesis of the correlation value 114 is determined in accordance with the relationship in magnitude indicated by the comparison result, as shown in FIG. 3B.

In this case, since the reception quality 111 is lower than the threshold 112 in the time slot TS3, the correlation value 114 is neither output from the path selecting section 120 nor synthesized in the time slot TS3.

As described above, when the reception quality calculated by the SRI calculator 191 deteriorates and becomes lower than the threshold as the influence of an interference wave increases within a reception delay amount selection processing period in the synchronous acquisition following section 105, the output of the correlation value 114 to the detection section 113 is stopped. With this operation, the detection data 107 from the path having undergone a deterioration in reception quality, of the paths corresponding to the FINGER processing sections 102A to 102N, is not output to the RAKE synthesizing section 103. As a consequence, only the detection data 107 with good reception qualities are synthesized. This suppresses a deterioration in the reception quality of a signal obtained by synthesis even if the influence of the interference wave increases.

Figure 1B:
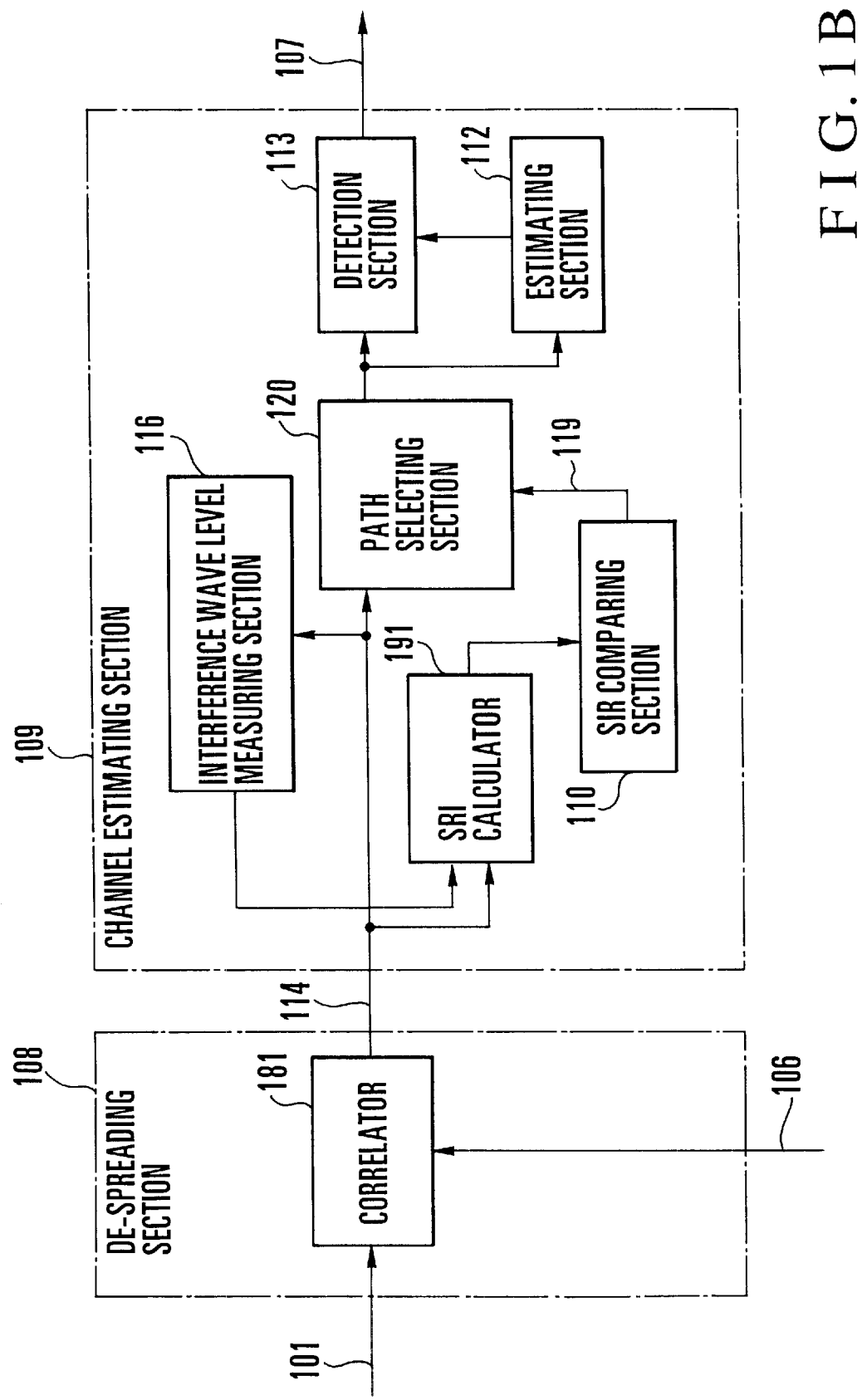
FIG. 1B is a block diagram showing a de-spreading section and channel estimating section in FIG. 1A.
Figure 4A:
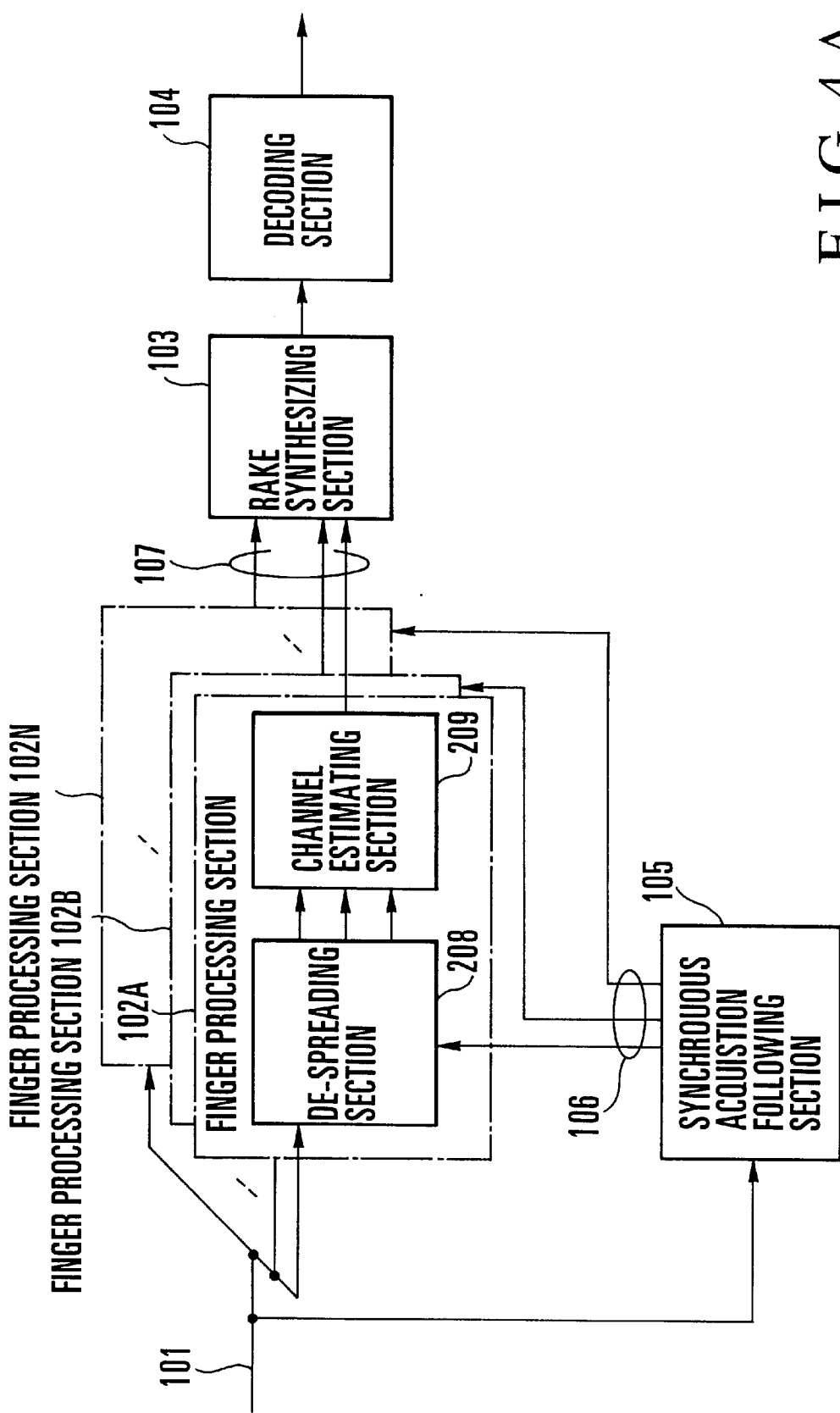
FIG. 4A is a block diagram showing a CDMA receiver according to the second embodiment of the present invention.
Figure 4B:
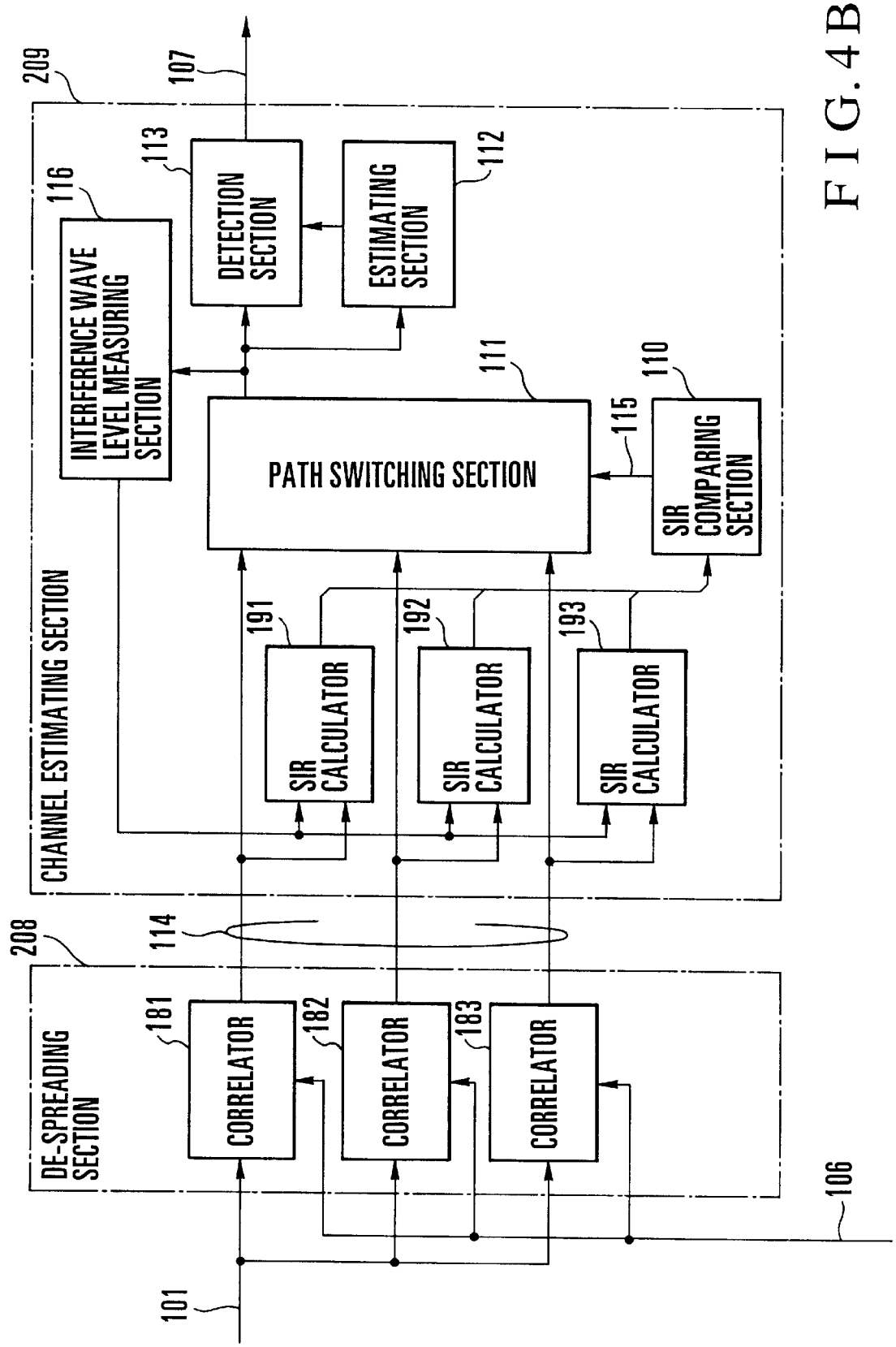
FIG. 4B is a block diagram showing a de-spreading section and channel estimating section in FIG. 4A.

FIG. 4A shows a CDMA receiver according to the second embodiment of the present invention. FIG. 4B shows a de-spreading section and channel estimating section in FIG. 4A. The same reference numerals in FIGS. 4A and 4B denote the same parts as in FIGS. 1A and 1B, and a description thereof will be omitted.

Referring to FIG. 4A, each of FINGER processing sections 102A to 102N is made up of a de-spreading section 208 and channel estimating section 209. The de-spreading section 208 has a plurality of correlators 181 to 183 for receiving a reception signal 101 and delay amount designation signal 106 and outputting different correlation values. In addition to an SIR comparing section 110, path switching section 111, estimating section 112, detection section 113, and interference wave level measuring section 116, the channel estimating section 209 includes a plurality of SIR calculators 191 to 193 for calculating reception qualities (SIR) on the basis of the correlation values from the correlators 181 to 183 and the interference wave level from the interference wave level measuring section 116, and outputting the reception qualities to an SIR comparing section 110.

In this embodiment, the de-spreading section 208 of each of the FINGER processing sections 102A to 102N obtains a plurality of correlation values from the reception signal 101 by using a plurality of different reception delay amounts, and the channel estimating section 209 selects one of the correlation values from the de-spreading section 208 which exhibits the best reception quality, and performs detection.

Figure 5:
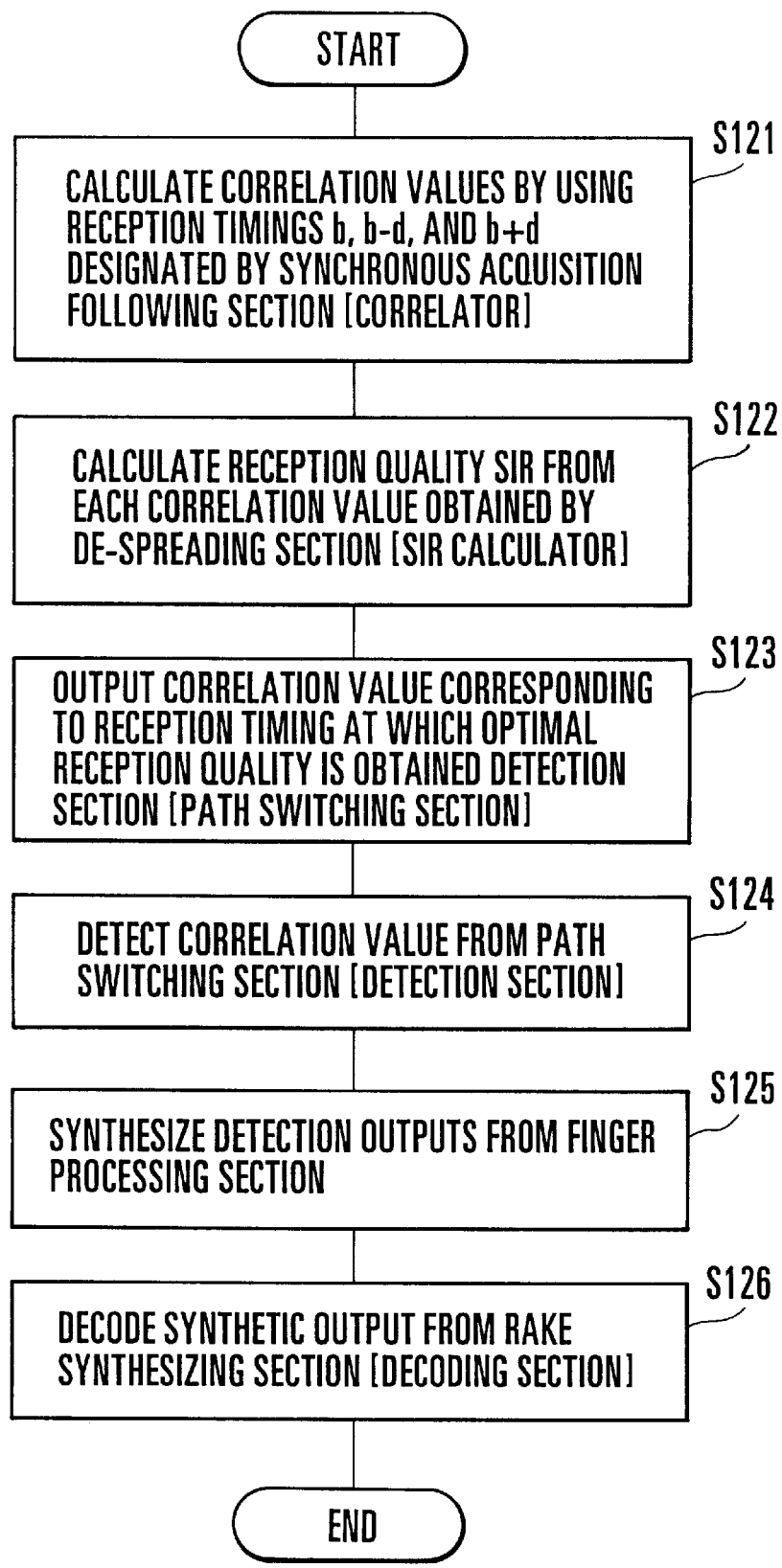
FIG. 5 is a flow chart showing the operation of the CDMA receiver in FIG. 4A.

The operation of the CDMA receiver having the above arrangement will be described next with reference to FIGS. 5, 6a, and 6B.

In the de-spreading section 208 of each of the FINGER processing sections 102A to 102N, each of the correlators 181 to 183 obtains a correlation value 114 by using the reception delay amount (first reception delay amount) designated by the delay amount designation signal 106 from a synchronous acquisition following section 105 and a reception delay amount (second reception delay amount) obtained by increasing/decreasing the above reception delay amount by a predetermined correction amount, e.g., 0.5 chip (one chip=one bit of a spreading code) (step S121).

In the channel estimating section 209, the SIR calculators 191 to 193 arranged in correspondence with the correlators 181 to 183 respectively calculate the reception qualities of the respective correlation values (step S122). The SIR comparing section 110 compares the respective reception qualities calculated by the SIR calculators 191 to 193, and the path switching section 111 selects a correlation value indicating the best reception quality in accordance with a comparison result 115 (step S123).

The detection section 113 detects the correlation value from the path switching section 111 (step S124) and outputs a detection output 107 to a RAKE synthesizing section 103. The RAKE synthesizing section 103 synthesizes the detection outputs 107 from the FINGER processing sections 102A to 102N (step S125). A decoding section 104 decodes the synthesis result (step S126).

Figure 9:
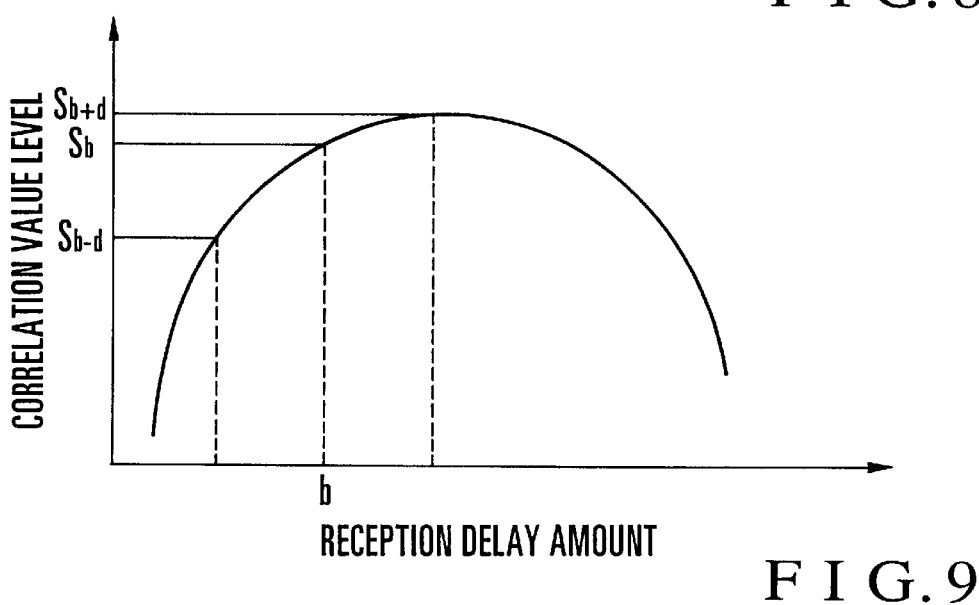
FIG. 9 is a graph for explaining still another delay profile indicating the relationship between a correlation value level and a reception delay amount.

FIGS. 9 shows another example of the delay profile, in which a reception delay amount b (see FIG. 7) is selected by the synchronous acquisition following section 105.

As shown in FIG. 9, the correlator 182 obtains a correlation value using the reception delay amount b, the correlator 181 obtains a correlation value using a reception delay amount b+d obtained by increasing (delaying) the reception delay amount b by a predetermined correction value d, and the correlator 183 obtains a correlation value using a reception delay amount b−d obtained by decreasing (advancing) the reception delay amount b by a correction amount d.

Levels Sb, Sb−d, and Sb+d respectively indicate the levels of the correlation values based on the reception delay amounts b, b−d, and b+d. In this case, the correlation value level Sb+d based on the reception delay amount b+d obtained by the correlator 181 is higher than the correlation value level Sb based on the reception delay amount b designated by the synchronous acquisition following section 105.

In this case, the path switching section 111 selects the correlation value based on the reception delay amount b+d obtained by the correlator 181, and outputs it to the detection section 113 on the subsequent stage. This operation amounts to correction of the reception delay amount b designated by the synchronous acquisition following section 105 by the predetermined correction amount +d on the FINGER processing section side.

Even if, therefore, the influence of an interference wave increases after the reception delay amount b is selected within the reception delay amount selection processing period in the synchronous acquisition following section 105, a better correlation value is selected. This suppresses a deterioration in the reception quality of the signal obtained by synthesis. In general, even if the state of a path changes in a period shorter than a relatively long selection processing period of 100 ms to several s, a deterioration in reception quality is suppressed, and excellent follow-up performance can be obtained.

Figures 6A, 6B:
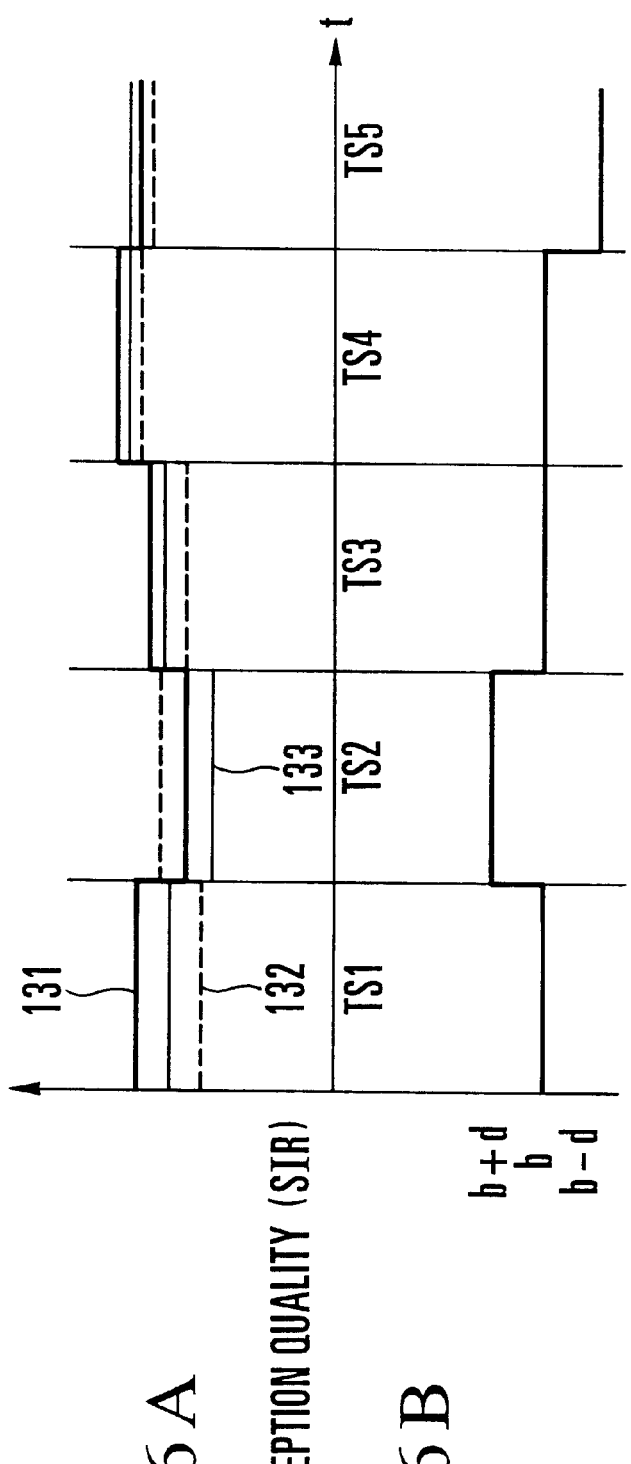
FIGS. 6A and 6B are timing charts showing the operations of an SIR comparing section and path selecting section in FIG. 4B.

As shown in FIG. 6A, therefore, the SIR comparing section 110 compares reception qualities 131 to 133 from the SIR calculators 191 to 193 for each reception delay amount designated by the synchronous acquisition following section 105, i.e., for every time slots TS1 to TS5. As shown in FIG. 6B, in accordance with the relationship in magnitude indicated by the comparison result, it is determined which correlation value 114 using a specific reception delay amount (reception timing) is detected.

In this case, in the time slot TS2, the reception quality 132 exhibits the best quality in the time slot TS2, and hence the correlation value 114 based on the reception delay amount b+d is output from a path selecting section 120. In the time slot TS5, the reception quality 133 exhibits the best quality, and hence the correlation value 114 based on the reception delay amount b−d is output. In the remaining time slots TS1, TS3, and TS4, since the reception quality 131 exhibits the best quality, the correlation value 114 based on the reception delay amount b is output.

In the second embodiment, correlation values are concurrently calculated by using three reception delay amounts including the reception delay amount b designated by the synchronous acquisition following section 105 and the reception delay amounts b+d and b−d obtained by increasing/decreasing the reception delay amount b by the correction amount d. However, the present invention is not limited to three reception delay amounts, and correlation values may be concurrently calculated by using four or more reception delay amounts.

Figure 10:
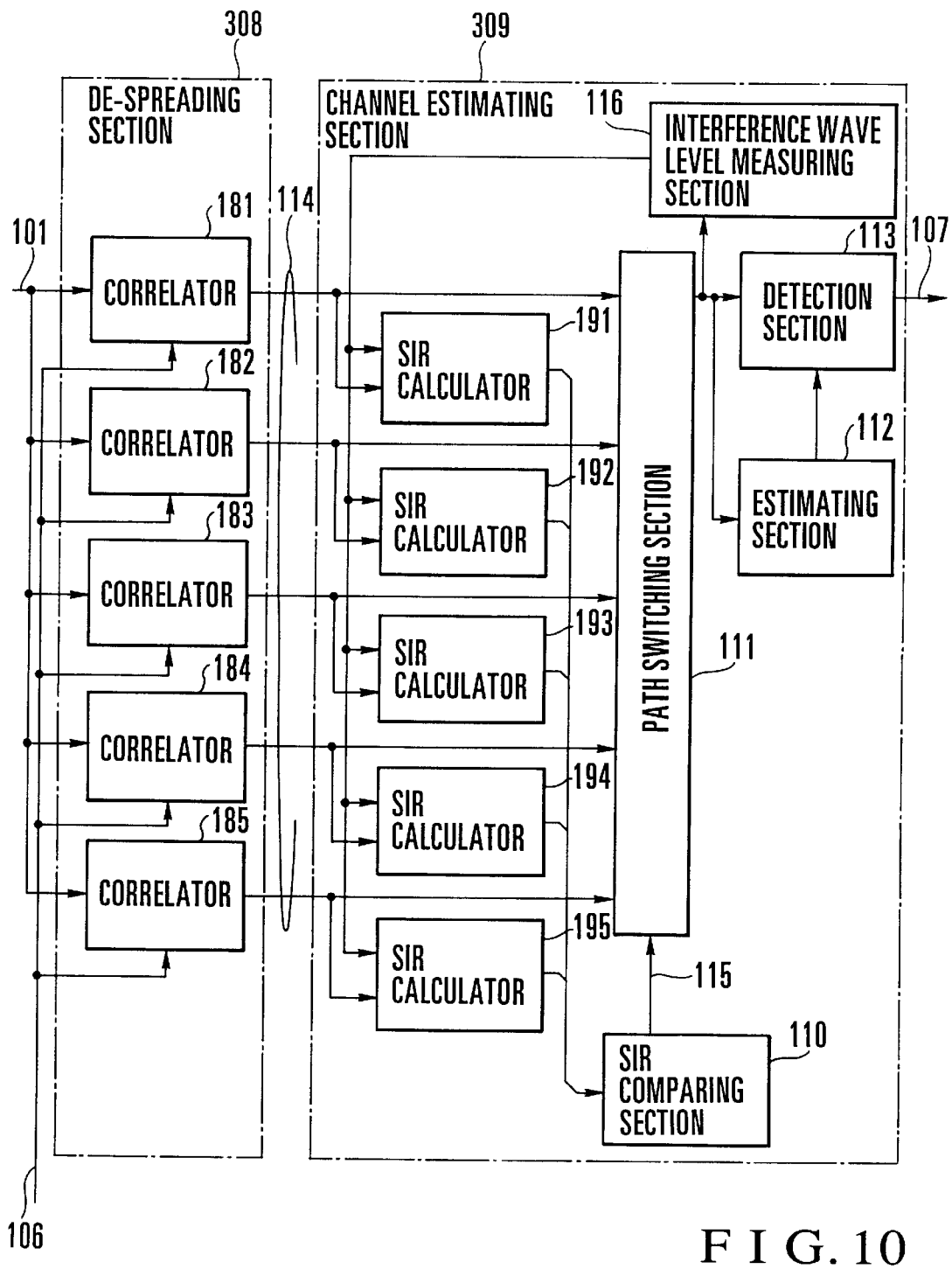
FIG. 10 is a block diagram showing another FINGER processing section.

FIG. 10 shows another arrangement of a FINGER processing section. In this case, the numbers of correlators and SIR calculators shown in FIG. 4B are increased from three to five each, and correlation values are concurrently calculated by using five reception delay amounts.

In this case, the reception delay amounts in correlators 181 to 185 are respectively set to b−d, b−d/2, b, b+d/2, and b+d. With this arrangement, the reception delay amount b designated by the synchronous acquisition following section 105 can be corrected finely as compared with the case shown in FIG. 7.

Figure 11A:
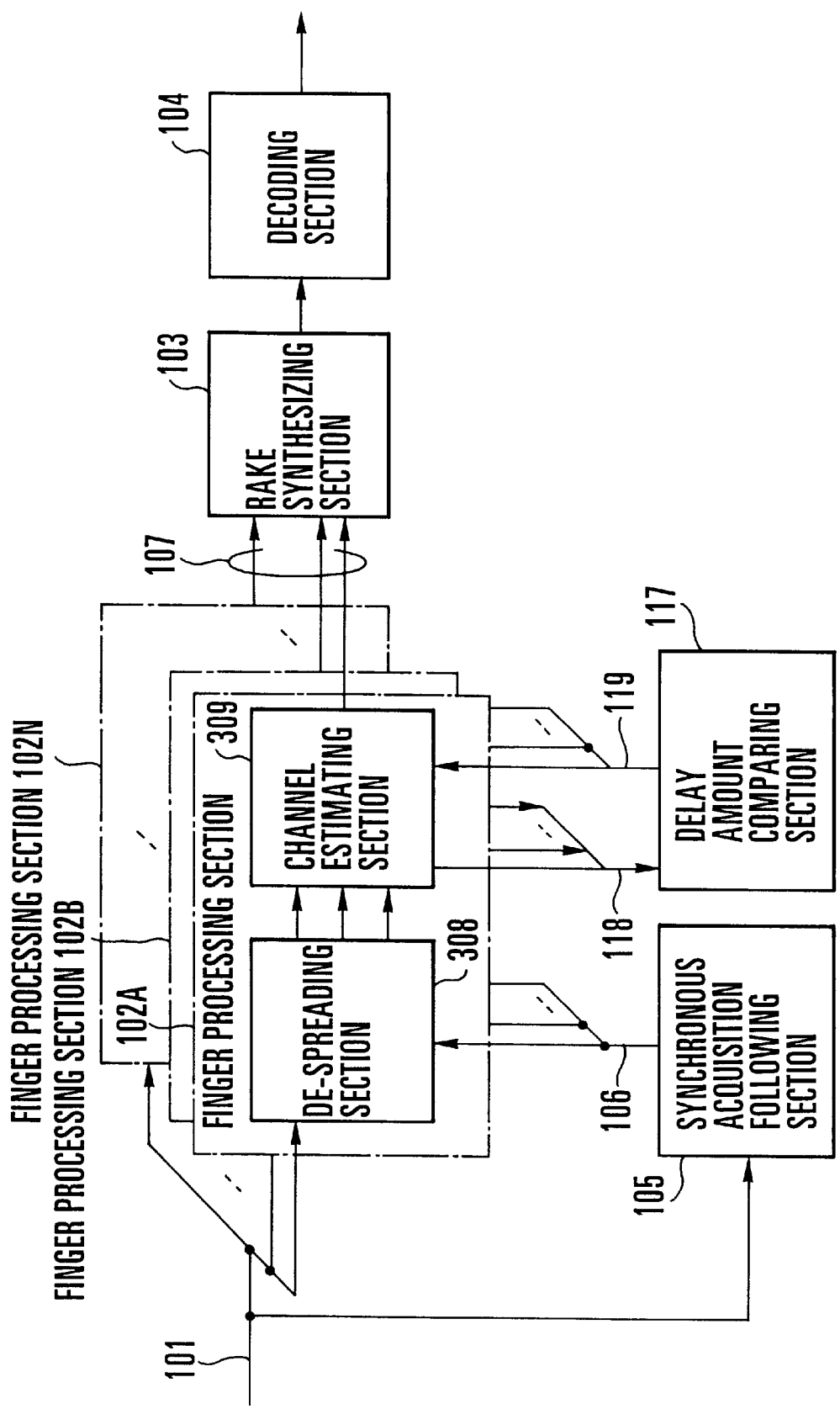
FIG. 11A is a block diagram showing a CDMA receiver according to the third embodiment of the present invention.
Figure 11B:
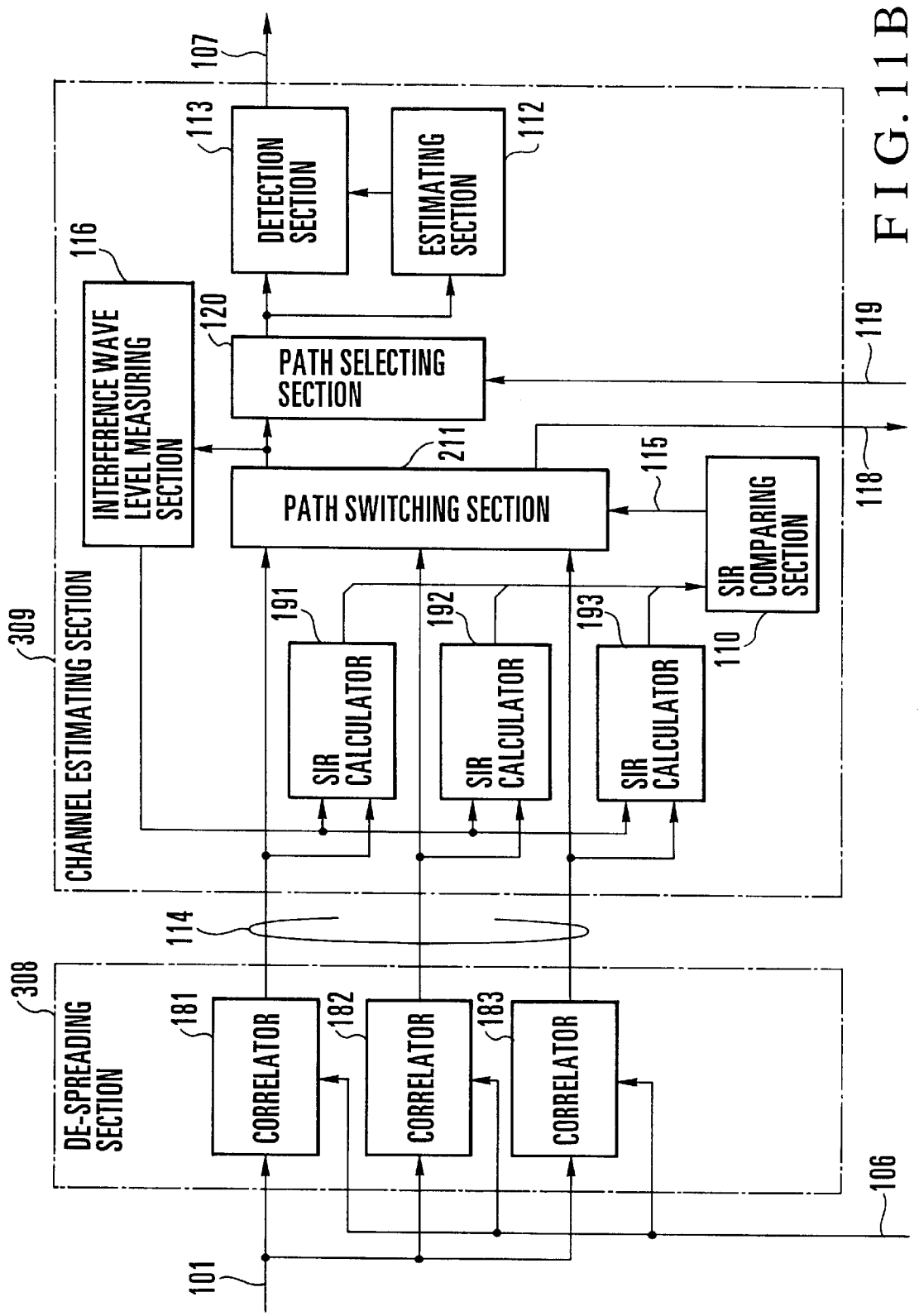
FIG. 11B is a block diagram showing a de-spreading section and channel estimating section in FIG. 11A.

FIG. 11A shows a CDMA receiver according to the third embodiment of the present invention. FIG. 11B shows a de-spreading section and channel estimating section in FIG. 11A. The same reference numerals in FIGS. 11A and 11B denote the same parts as in FIGS. 1A, 1B, 4A, and 4B, and a description thereof will be omitted.

In this embodiment, a delay amount comparing section 117 compares the reception delay amounts corrected by FINGER processing sections 102A to 102N. If the same reception delay amount is selected by different FINGER processing sections, only detection data from one of the FINGER processing sections is RAKE-synthesized.

Referring to FIG. 11A, this embodiment further includes the delay amount comparing section 117 for comparing the corrected reception delay amounts notified from the FINGER processing sections 102A to 102N over delay amount notification signals 118. As shown in FIG. 11B, a channel estimating section 309 of each of the FINGER processing sections 102A to 102N has a path selecting section 120 between a path switching section 211 and a detection section 113 (or estimating section 112).

The delay amount comparing section 117 compares the corrected reception delay amounts sent from the path switching sections 211 of the FINGER processing sections 102A to 102N over the delay amount notification signals 118 and checks whether the same reception delay amount is selected by different FINGER processing sections.

Figure 12:
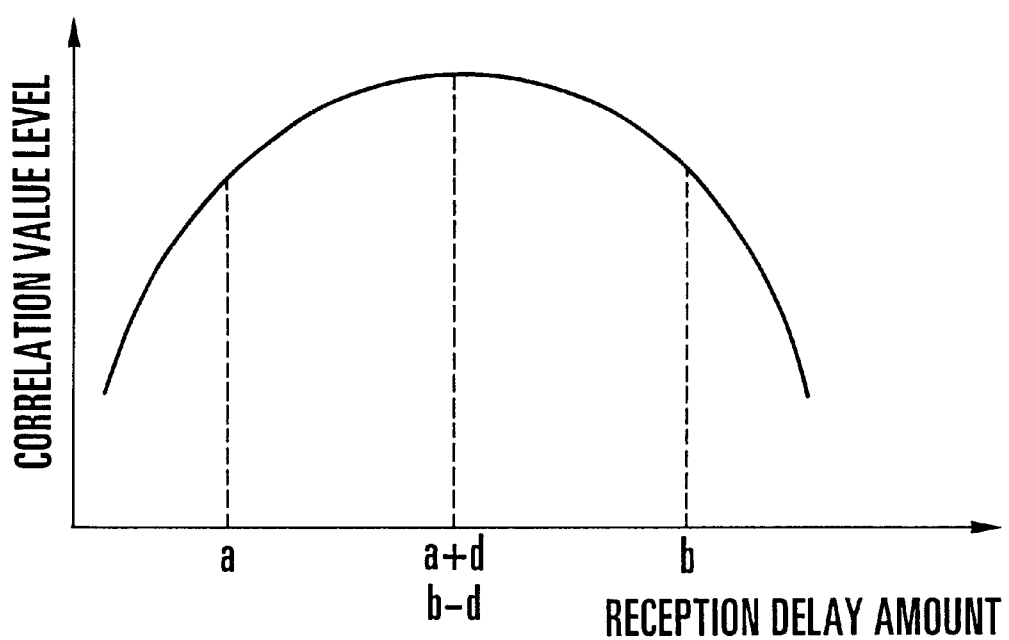
FIG. 12 is a graph showing still another delay profile indicating the relationship between a correlation value level and a reception delay amount.
Figure 14A:
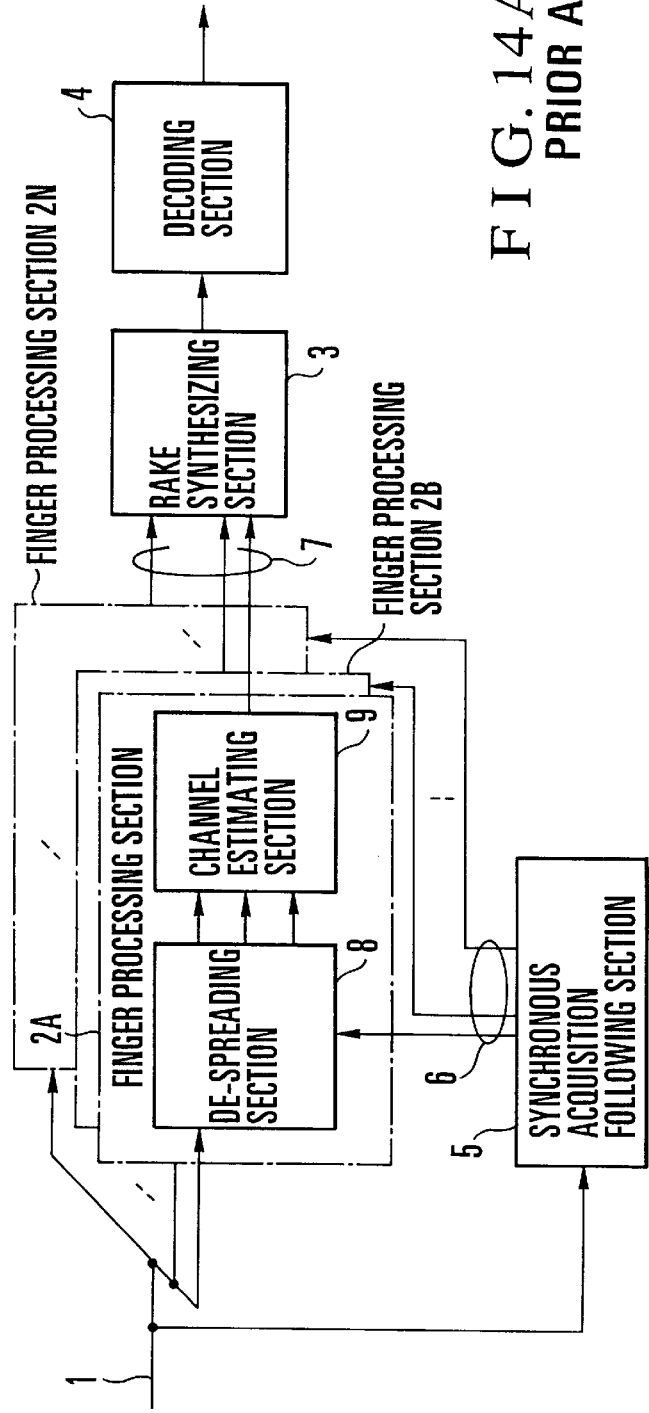
FIG. 14A is a block diagram showing a conventional CDMA receiver.
Figure 14B:
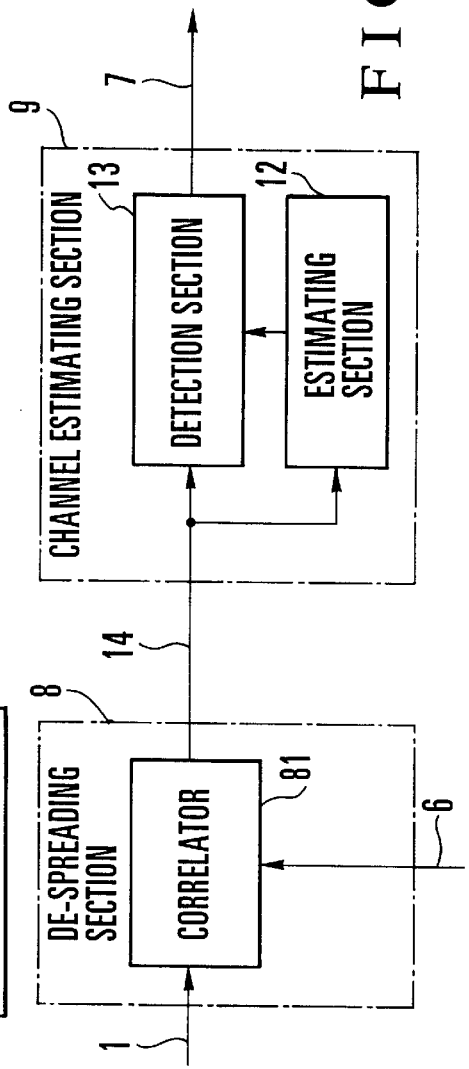
FIG. 14B is a block diagram showing a de-spreading section and channel estimating section in FIG. 14A.

FIG. 12 shows another example of a delay profile. In this case, reception delay amounts a and b designated by the synchronous acquisition following section 105 are respectively corrected to a+d and b−d. As a result, the two reception delay amounts become the same.

In this case, when the same reception delay amount is selected, the delay amount comparing section 117 outputs a path selection signal 119 to any one of the FINGER processing sections which selects the same reception delay amount. In addition, the path selection signal 119 is output to the FINGER processing sections for which the same reception delay amount is not selected.

In each of the FINGER processing sections 102A to 102N, only when the path selection signal 119 is output from the delay amount comparing section 117, a correlation value 114 selected by the path switching section 111 is output to the detection section 113 and estimating section 112 through the path selecting section 120. Detection data 107 is then output to a RAKE synthesizing section 103.

In each of the FINGER processing sections 102A to 102N, only when the path selection signal 119 is output from the delay amount comparing section 117, a correlation value selected by the path switching section 111 is output to the detection section 113 and estimating section 112 through the path selecting section 120, and detection data is output to a RAKE synthesizing section 103.

With this operation, even when the respective FINGER processing sections 102A to 102N separately correct the reception delay amounts, the detection data 107 obtained from the correlation value 114 using the same reception delay amount is not redundantly input to the RAKE synthesizing section 103. As a consequence, the detection data 107 from the FINGER processing sections 102A to 102N can be uniformly synthesized.

FIG. 13 shows a FINGER processing section of a CDMA receiver according to the fourth embodiment of the present invention.

In this embodiment, in each of the FINGER processing sections 102A to 102N of the second embodiment (FIGS. 4A and 4B), only when the reception quality indicated by the correlation value 114 selected by the path switching section 111 is good, the RAKE synthesizing section 103 synthesizes the detection data 107 obtained from the correlation value 114.

In a channel estimating section 409 shown in FIG. 13, a channel estimating section 109 of each of the FINGER processing sections 102A to 102N has a path selecting section 120 between a path switching section 111 and a detection section 113 (and estimating section 112). The path selecting section 120 is controlled by a path selection signal 119 from an SIR comparing section 110.

In this arrangement, the reception qualities calculated by SIR calculators 191 to 193 are compared with each other by an SIR comparing section 210, and a correlation value indicating the best reception quality is selected by the path switching section 111 in accordance with a comparison result 115. In this case, the SIR comparing section 210 compares the selected best reception quality with a predetermined threshold. Only when the reception quality is equal to or higher than the threshold, the path selection signal 119 is output.

With this operation, only when the reception quality indicated by the correlation value 114 selected by the path switching section 111 is higher than the threshold, the correlation value 114 is input to the detection section 113 and estimating section 112 through the path selecting section 120. The detection data obtained from the correlation value 114 is output to the RAKE synthesizing section 103.

With this operation, therefore, the RAKE synthesizing section 103 synthesizes only the detection data 107 obtained from proper correlation values, of the correlation values obtained by using reception delay amounts corrected by the FINGER processing sections 102A to 102N, on which the influences of interference waves are little. As a consequence, a deterioration in the reception quality of the signal obtained by synthesis is suppressed.

In each embodiment described above, when an interference wave level measuring section 116 is to measure an interference wave level from the correlation value 114, measurement is performed as follows.

In, for example, QPSK (Quadrature Phase Shift Keying) for performing quadrature multiplexing communication using four different phases, symbol points corresponding to the respective phases appear on the IQ plane. In this case, when the interference wave level rises, the position of the symbol point obtained from a reception signal deviates from a logic position. The magnitude of the interference wave level can therefore be obtained by obtaining the variance of errors between the position of the symbol obtained from a reception signal and a logic position.

A method of measuring an interference wave level from the correlation value 114 is not limited to this, and a conventional known method may be used.

As has been described above, according to the present invention, only when the level difference between a correlation value and an interference wave is large, and the reception quality is good, the detection data obtained from the correlation value is synthesized by the synthesizing section. In addition, detection data having undergone a deterioration in reception quality is not synthesized. Even if, therefore, the interference wave level rises, a deterioration in the reception quality of the signal obtained by synthesis can be suppressed.

In addition, since the synthesizing section synthesizes the detection data obtained from a correlation value indicating the best reception quality, of a plurality of correlation values obtained by using the first and second reception delay amounts, which exhibits a large level difference between the correlation value and an interference wave. Even if, therefore, the interference wave level rises after a reception delay amount is selected in the synchronous acquisition following section 105, the reception delay amount is corrected, and a better correlation value is selected. For this reason, a deterioration in the reception quality of the signal obtained by synthesis can be suppressed, and excellent follow-up performance can be obtained.

What is claimed is:

1. A CDMA reception method comprising the steps of:

presetting a plurality of different reference reception delay amounts on the basis of a correlation profile obtained by de-spreading a reception signal;

obtaining a plurality of correlation values on the basis of at least each of the preset reference reception delay amounts;

measuring a plurality of interference wave levels on the basis of the obtained correlation values;

determining, on the basis of reception qualities obtained from the correlation values corresponding to the measured interference wave levels, whether detection signals obtained from the respective correlation values are synthesized; and synthesizing permitted detection signals and decoding the synthetic signal.

2. A method according to claim 1, wherein the step of obtaining the correlation values comprises the step of obtaining a plurality of correlation values by de-spreading the reception signal by using the preset reference reception delay amounts.

3. A method according to claim 1, wherein the step of obtaining the correlation values comprises the steps of:

obtaining a plurality of correlation values by separately de-spreading the reception signal by using the preset reference reception delay amounts and corrected reception delay amounts obtained by slightly correcting the reference reception delay amounts; and selecting one of an optimal correlation value from the obtained correlation values.

4. A method according to claim 3, wherein the step of de-spreading comprises the step of separately de-spreading the reception signal by using the preset reference reception delay amounts and a plurality of corrected reception delay amounts obtained by increasing/decreasing the reference reception delay amounts by a predetermined correction amount.

5. A method according to claim 3, further comprising the steps of:

comparing reception delay amounts corresponding to selected optimal correlation values; and when correlation values using the same reception delay amount are selected, synthesizing only detection signals corresponding to one of the correlation values.

6. A method according to claim 3, wherein the step of selecting an optimal correlation value comprises the steps of:

measuring an interference wave level from each obtained correlation value;

calculating an SIR based on each measured interference wave level and a corresponding correlation value; and selecting a correlation value, of the calculated SIRs, from which an optimal reception quality is obtained as an optimal correlation value.

7. A method according to claim 1, further comprising the steps of:

calculating an SIR corresponding to each correlation value on the basis of an obtained correlation value and an interference wave level obtained from the correlation value; and determining, on the basis of a calculated SIR, whether detection signals obtained from corresponding correlation values are synthesized.

8. A CDMA receiver comprising:
a synchronous acquisition following section in which a plurality of reference reception delay amounts are preset on the basis of a correlation profile obtained by de-spreading a reception signal;
a plurality of reception processing sections for outputting detection signals on the basis of the respective correlation values obtained by de-spreading the reception signal by using the respective reference reception delay amounts set in said synchronous acquisition following section;
a synthesizing section for synthesizing the respective detection signals from said reception processing sections; and
a decoding section for decoding a synthetic output from said synthesizing section,
each of said reception processing sections comprising:
correlation calculation means for obtaining a correlation value on the basis of the reference reception delay amount designated by said synchronous acquisition following section;
interference wave level measuring means for measuring an interference wave level on the basis of the correlation value from said correlation value calculation means;
SIR calculation means for calculating a reception quality on the basis of the interference wave level from said interference wave level measuring means and a corresponding correlation value; and
determination means for determining, on the basis of the SIR from said SIR calculation means, whether detection signals obtained from corresponding correlation values are synthesized.

9. A receiver according to claim 8, wherein said correlation value calculation means obtains a correlation value by de-spreading the reception signal by using a reference reception delay amount designated by said synchronous acquisition following section.

10. A receiver according to claim 8, wherein said correlation value calculation means comprises:
a plurality of correlators for obtaining correlation values by de-spreading the reception signal by using a reference reception delay amount designated by said synchronous acquisition following section and a corrected reception delay amount obtained by slightly correcting the reference reception delay amount; and
optimal correlation value selection means for selecting an optimal correlation value from the respective correlation values from said correlators.

11. A receiver according to claim 10, wherein said plurality of correlators separately de-spread the reception signal by using a reference reception delay amount and a plurality of corrected reception delay amounts obtained by increasing/decreasing the reference reception delay amount by a predetermined correction amount.

12. A receiver according to claim 10, further comprising:
delay amount comparing means for comparing reception delay amounts corresponding to selected optimal correlation values; and
path selection means for, when a comparison result obtained by said delay amount comparing means indicates that correlation values using the same reception delay amount are selected, outputting only a detection signal corresponding to one of the correlation values.

13. A receiver according to claim 10, wherein said optimal correlation value selection means comprises:
a plurality of SIR calculating sections for separately calculating SIRs on the basis of interference wave levels from said interference wave level measuring means and corresponding correlation values; and
a correlation value selecting section for selecting a correlation value from which an optimal SIR of the calculated SIRs is obtained as an optimal correlation value.

14. A receiver according to claim 8, further comprising:
an SIR calculating section for calculating an SIR corresponding to a correlation value on the basis of a correlation value from said optimal correlation value calculating means and an interference wave level obtained from a corresponding correlation value; and
determination section for determining, on the basis of the reception quality from the SIR, whether detection signals obtained from corresponding correlation values are synthesized.

* * * * *